United States Patent
Jekal

[11] Patent Number: 6,134,697
[45] Date of Patent: Oct. 17, 2000

[54] TRACEBACK PROCESSOR FOR USE IN A TRELLIS-CODED MODULATION DECODER

[75] Inventor: Heon Jekal, Seoul, Rep. of Korea

[73] Assignee: Daewoo Electronics Co., Ltd., Seoul, Rep. of Korea

[21] Appl. No.: 09/144,324

[22] Filed: Aug. 31, 1998

[30] Foreign Application Priority Data

Nov. 29, 1997 [KR] Rep. of Korea ....................... 97-64407

[51] Int. Cl.$^7$ .................................................. H03M 13/03
[52] U.S. Cl. ........................... 714/792; 714/795; 375/341
[58] Field of Search ................................... 714/792, 795, 714/819; 375/341

[56] References Cited

FOREIGN PATENT DOCUMENTS

| | | |
|---|---|---|
| 0677967 | 10/1995 | European Pat. Off. . |
| 0801501A2 | 10/1997 | European Pat. Off. . |
| 0813308 | 12/1997 | European Pat. Off. . |
| 2326570 | 12/1998 | United Kingdom . |
| 9319418 | 9/1993 | WIPO . |
| 9863500 | 8/1998 | WIPO . |

*Primary Examiner*—Phung M. Chung
*Attorney, Agent, or Firm*—Pennie & Edmonds LLP

[57] ABSTRACT

A traceback processor of a survivor memory unit for use in a trellis-coded modulation decoder, wherein the survivor memory unit includes a data delay processor for providing determination vectors in parallel and the traceback processor for selectively providing one of an N1 and an N2 state mode decoded symbols, with decoding depths respectively corresponding to the N1 and N2 state mode decoded symbols being D1 and D2, is provided. A first traceback module iteratively calculates an N1 and an N2 state mode ith previous states and provides one of an N1 and an N2 state mode (D1–1)st previous states, i being an integer ranging from 1 to (D1–1). A second traceback module provides an N1 state mode decoded symbol and an N2 state mode (D1)th previous state and a third traceback module iteratively calculates an N2 state mode jth previous state, j being an integer ranging from (D1+1) to (D2–1). A fourth traceback module provides an N2 state mode decoded symbol and a first mode selector selectively provides one of the N1 and the N2 state mode decoded symbols.

10 Claims, 7 Drawing Sheets

TRACEBACK PROCESSOR FOR USE IN A TRELLIS-CODED MODULATION DECODER

FIELD OF THE INVENTION

The present invention relates to a TCM decoder for decoding signals encoded by a trellis-coded modulation (TCM) scheme; and, more particularly, to a traceback processor for decoding TCM data in both 8 state mode and 16 state mode with reduced number of elements.

DESCRIPTION OF THE PRIOR ART

Recently, there has been increasing interest in a certain type of combined modulation and coding scheme, called trellis-coded modulation(TCM), that can achieve a coding gain without any bandwidth expansion in a bandwidth-limited channel. The TCM involves the use of a finite-state encoder and a non-binary modulator. Therefore, as compared with a conventional modulation, the TCM can achieve net coding gains of 3 to 6 dB over an uncoded case, in the presence of an additive white Gaussian noise(AWGN).

In a process implementing a concatenated coding by connecting two different coders, e.g., an inner and an outer coders, to enhance data reliability, a well known convolutional encoder or a TCM encoder is used as the inner coder, while a Reed-Solomon coder can be used as the outer coder. The outer coder corrects errors which have not been remedied at the inner coder to thereby minimize the rate of errors. This concatenated coding technique achieves more advanced implementation with a much less complex hardware than a coding technique having only one coding process.

At a receiving end, the TCM data encoded by the inner coder is decoded by a trellis decoder employing a Viterbi algorithm. The trellis decoder is a maximum likelihood decoder that provides a forward error correction. Trellis decoding is used in decoding a sequence of encoded symbols, e.g., a bit stream. The bit stream can represent encoded information in telecommunication transmission through various media with each set of bits representing a symbol instant. In the decoding process, the trellis decoder works back through a sequence of possible bit sequences at each symbol instant to determine which of the bit sequences could most likely have been transmitted. The possible transitions from a bit at one symbol instant or state to a bit at a next or subsequent symbol instant or state are limited. Each possible transition from one state to another can be shown graphically and defined as a branch.

A sequence of interconnected branches defines a path. Each state can transit only to a limited number of next states upon receiving a next bit in the bit stream. Thus, certain paths survive during the decoding process and the other paths do not. By eliminating those transition paths that are not permissible, computational efficiency can be improved in determining those paths most likely to survive. The trellis decoder typically defines and calculates a branch metric associated with each branch and employs this branch metric to determine which paths will survive and which paths will not.

A branch metric is calculated at each symbol instant for each possible branch. Each path has an associated metric, an accumulated value, that is updated at each symbol instant. For each possible transition, the accumulated value for a next state is obtained by selecting the smallest of the sums of the branch metrics for different possible transitions and the path metrics from the previous states.

While several paths may survive at transition from one symbol instant to a next symbol instant, there is only one path accumulated with a minimum value. A sequence of symbol instants is referred to as a traceback. The number of symbol instants tracing back through the trellis that extends a path with the minimum accumulated value defines the length, or decoding depth D, of the traceback. The individual state in the trellis associated with the minimum accumulated value in a traceback is translated into most likely bits that could have been transmitted in that symbol instant. The bits are referred to as a decoded symbol.

Figure 1:
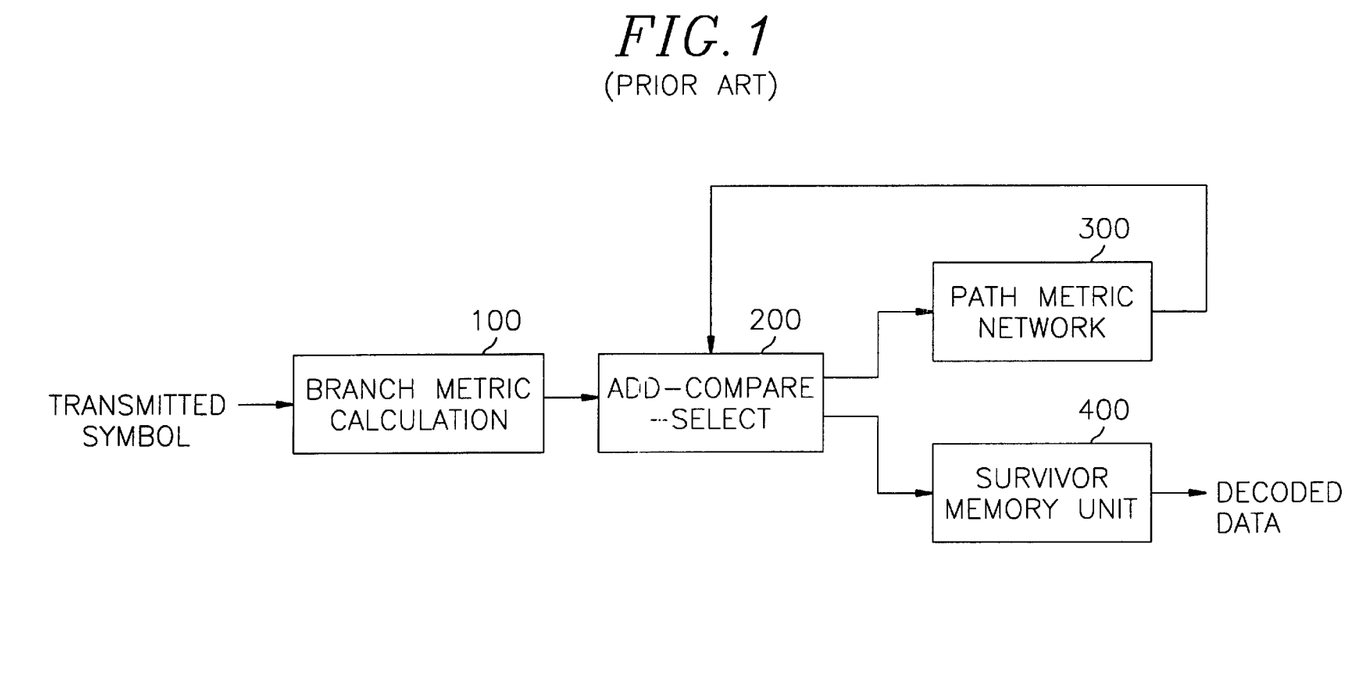
FIG. 1 shows a block diagram of a conventional trellis decoder applied with a Viterbi algorithm.

Referring to FIG. 1, there is shown a schematic block diagram of a conventional trellis decoder including a branch metric calculation unit(BMU) 100, an add-compare-select unit (ACS) 200, a path metric network(PMN) 300, and a survivor memory unit(SMU) 400.

The branch metric calculation unit 100 receives a sequence of transmitted symbols and calculates branch metrics, i.e., distances between branches associated with each state and the transmitted symbol. The branch metrics are provided to the add-compare-select unit 200.

The add-compare-select unit 200 chooses a path having a minimum path metric among the paths corresponding to each state. Specifically, the add-compare-select unit 200 adds the branch metrics provided from the branch metric calculation unit 100 to corresponding previous path metrics from the path metric network 300; and compares candidate path metrics, i.e., the sums of the branch metrics and the corresponding previous path metrics with one another to thereby choose a new path metric having a smallest value. The selected path metric is provided to the path metric network 300 as a new path metric for each state and information for tracing back on the selected path is coupled to the survivor memory unit 400.

The survivor memory unit 400 stores the information from the add-compare-select unit 200 as the length of a survivor path, i.e., a decoding depth in order to decode the transmitted symbols and outputs decoded data by tracing back to the survivor path based on a traceback algorithm.

An exemplary trellis decoder having the above structure is a decoder used in a GA HDTV receiving system proposed by a Grand Alliance (GA). The GA HDTV transmission system encodes data in an 8-level vestigial sideband modulation (VSB) mode and transmits the coded data on a frame-by-frame basis. The decoder in GA HDTV has two different paths depending on whether a National Television System Committee (NTSC) interference rejection filter is used or not. If the NTSC interference rejection filter is not used, a maximum likelihood response trellis decoder that performs 8-state mode decoding for a real channel with the AWGN is utilized only to restore input symbols. On the other hand, in the event the NTSC interference rejection filter is used, the output signals of the filter are changed from 8 to 15 levels according to the transfer function of the filter and, therefore, a partial response trellis decoder which performs 16 state mode decoding should be utilized.

The trellis coding has a strong characteristic against the AWGN but a weak characteristic against a group error and, therefore, input symbols may be sequentially inputted to 12 trellis coding blocks which are connected in parallel so that the input symbols may be 12 symbol intra-segment interleaved. Since TCM codes have been interleaved by a unit of 12 symbols at the trellis code interleaver of a GA HDTV receiving system, the trellis code deinterleaver must involve 12 number of trellis decoders connected in parallel in order to deinterleave transmitted data. Accordingly, each of the trellis decoders deinterleaves to decode every 12th symbol sequentially inputted.

Figure 2:
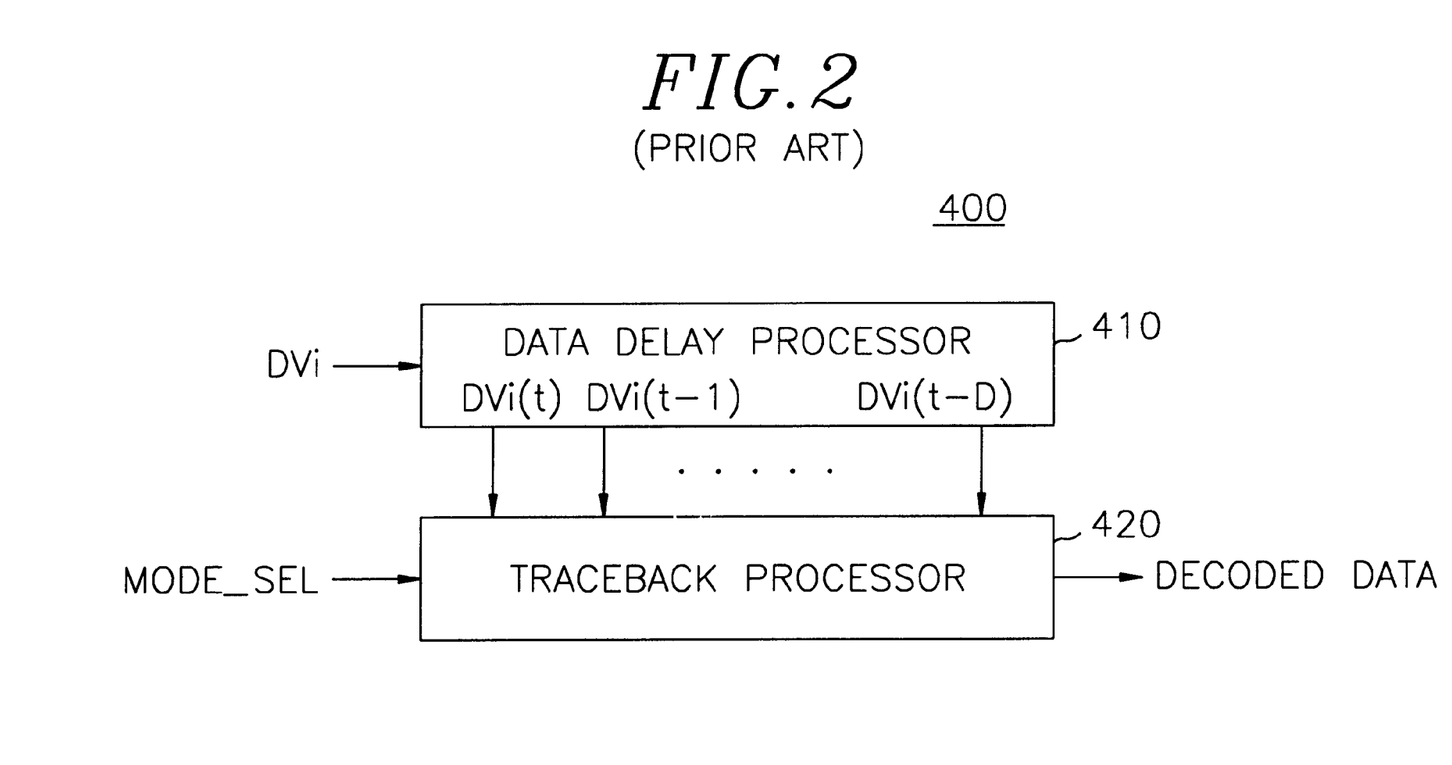
FIG. 2 describes a block diagram of a conventional survivor memory unit(SMU) for use in 16/8 state mode.

Referring to FIG. 2, there is shown a block diagram of the conventional survivor memory unit(SMU) 400, wherein the SMU 400 includes a data delay processor 410 and a traceback processor 420. The data delay processor 410 receives the determination vector DVi of the survivor path for each state from the add-compare-select(ACS) unit 200 to store same therein and, after a delay for predetermined clocks, provides the determination vectors DVi's with a same index among the saved determination vectors at a same time, wherein an index i is equal to an index of intra-segment interleaved data.

The traceback processor 420 carries out both an optical response traceback, i.e., a maximum likelihood response traceback, algorithm for the 8 state mode and a partial response traceback algorithm for the 16 state mode by using the determination vectors DVi's fed from the data delay processor 410 so as to obtain the 8 state mode symbol and a 16 state mode symbol; and provides either the 8 state mode symbol or the 16 state mode symbol based on a mode selection signal(MODE_SEL).

Figure 3:
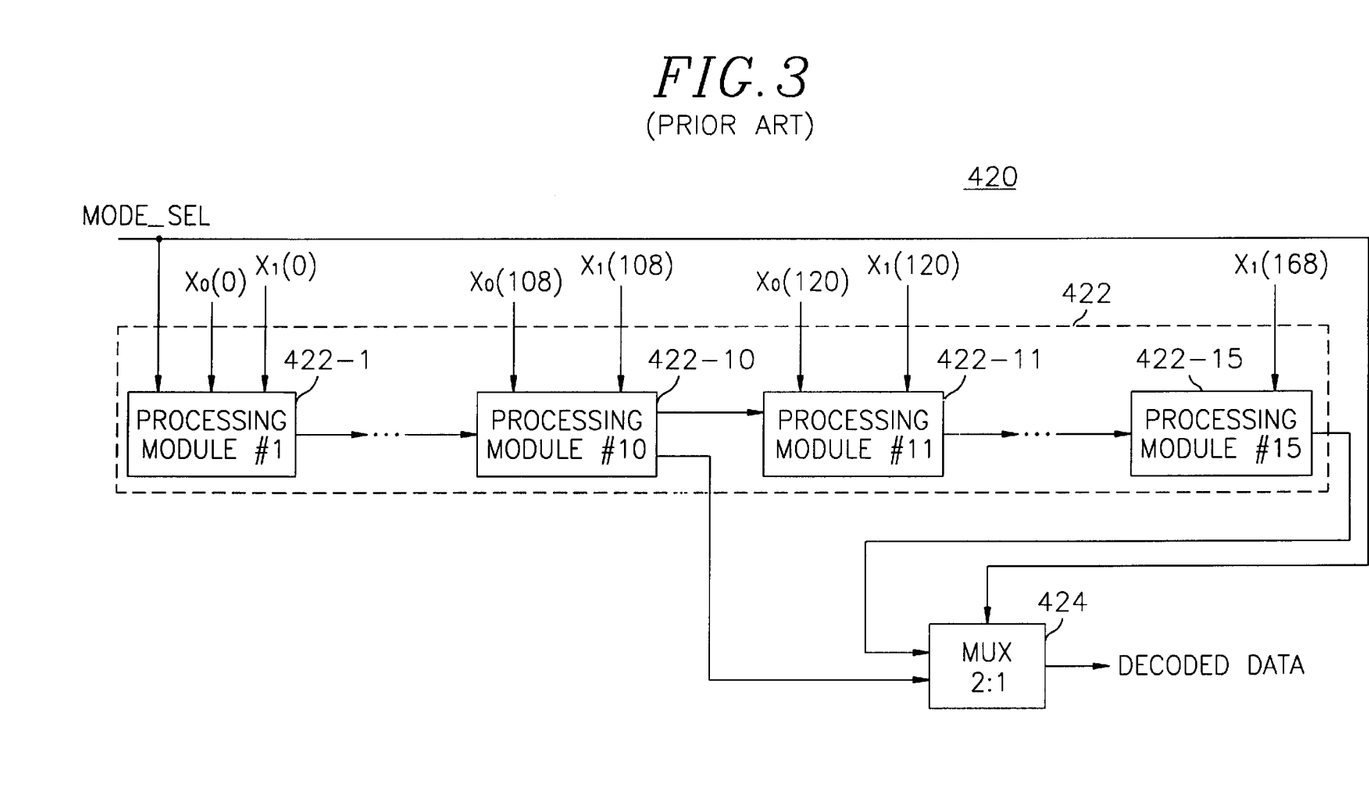
FIG. 3 illustrates a conventional traceback processor having 15 processing modules.

Referring to FIG. 3, there is illustrated a block diagram of a traceback processor 420 shown in FIG. 2, which is disclosed in a copending commonly owned application, U.S. Ser. No. 09/123,953, entitled "A TRACEBACK PROCESSOR FOR USE IN A TCM DECODER". The traceback processor 420 has an operation module 422 and a mode selector 424. The operation module 422 contains a plurality of processing modules 422-1 to 422-15 in serial for calculating the decoded symbol by tracing back a determination vector of either the 16 state mode for the partial response channel or the 8 state mode for the maximum likelihood response channel based on a mode selection (MODE_SEL) signal as far as the decoding depth thereof. The mode selector 424 provides either the 16 state mode symbol or the 8 state mode symbol based on the MODE_SEL signal.

If the MODE_SEL signal represents 16 state mode, the operation module 422 traces back the determination vectors of 16 state mode for the partial response channel as far as the decoding depth 15 thereof. Each of the 14 processing modules 422-1 to 422-14, e.g., a kth processing module 422-k, receives two elements $[X_1\{12(k-1)\}, X_0\{12(k-1)\}]$ of a determination vector $DVi\{t-(k-1)\}$ fed in parallel from the data delay processor 410 shown in FIG. 2, and calculates a previous state S(t-k) to be provided to the next processing module, wherein k is an integer between 1 and 14. The last processing module 422-15 receives lower bits $X_1$ (12×14) of a determination vector DVi(t-14) from the data delay processor 410 and calculates the partial response decoded symbol $[X_1(t-15), X_0(t-15)]$ by the use of a previous state S(t-14) and the lower bits $X_1(12\times14)$ of the determination vector DVi(t-14).

According to the traceback algorithm in the 16 state mode, the previous state $(S'_3, S'_2, S'_1, S'_0)$ may be determined by a logical operation of the current state $(S_3, S_2, S_1, S_0)$ and the determination vector $(X_1, X_0)$ as follows:

$$(S'_3, S'_2, S'_1, S'_0)=(S_3 \oplus X_1, S_1 \oplus S_0, S_2, X_0) \qquad \text{Eq. (1)}$$

If the MODE_SEL signal represents 8 state mode, the operation module 422 traces back the determination vectors of 8 state mode for the maximum likelihood response channel as far as the decoding depth 10 thereof. Each of the 9 processing modules 422-1 to 422-9, e.g., the kth processing module 422-k, receives two elements $[X_1\{12(k-1)\}, X_0\{12(k-1)\}]$ of a determination vector $DVi\{t-(k-1)\}$ fed in parallel from the data delay processor 410 and calculates a previous state S(t-k) to be provided to the next processing module, wherein k is an integer between 1 and 9.

The 10th processing module 422-10 receives lower bits $X_1(12\times9)$ of a determination vector DVi(t-9) from the data delay processor and calculates the maximum likelihood response decoded symbol $(X_1(t-10), X_0(t-10))$ by the use of a previous state S(t-9) and the lower bits $X_1(12\times9)$ of the determination vector DVi(t-9). According to the traceback algorithm in the 8 state mode, the previous state $(S'_2, S'_1, S'_0)$ may be determined by a logical operation of the current state $(S_2, S_1, S_0)$ and the determination vector $(X_1, X_0)$ as follows:

$$(S'_2, S'_1, S'_0)=(S_2 \oplus X_1, X_0 \oplus S_0, S_1) \qquad \text{Eq. (2)}$$

As is illustrated above, 9 processing modules, i.e., the 1st processing module 422-1 to the 9th processing module 422-9, are implemented with a same structure and operation; and 4 processing modules, i.e., the 11th processing module 411-11 to the 14th processing module 411-14, are implemented with another same structure and operation. Thus, it is required to eliminate the structural and operational redundancy to thereby increase the efficiency of the traceback processor 420.

SUMMARY OF THE INVENTION

It is, therefore, a primary object of the present invention to provide a traceback processor for decoding trellis-coded modulation data with a minimum number of processing modules.

In accordance with the present invention, there is provided a traceback processor of a survivor memory unit for use in a trellis-coded modulation decoder, wherein the survivor memory unit includes a data delay processor and the traceback processor, the data delay processor provides determination vectors in parallel and the traceback processor selectively provides one of an N1 and an N2 state mode decoded symbols during M number of CONTROL signals, a decoding depth corresponding to the N1 state mode decoded symbol being D1, a decoding depth corresponding to the N2 state mode decoded symbol being D2, N1 being a positive integer, N2 being an integer larger than N1, D1 being a positive integer, D2 being an integer larger than D1 and M being an integer larger than D2, the traceback processor comprising: a first traceback module, based on an ith CONTROL signal, for sequentially selecting an ith determination vector, iteratively calculating an N1 state mode ith previous state by using an N1 state mode (i-1)st previous state mode and the ith determination vector and an N2 state mode ith previous state by using an N2 state mode (i-1)st previous state and the ith determination vector, and providing one of an N1 state mode (D1-1)st previous state and an N2 state mode (D2-1)st previous state, based on a mode selection signal, wherein i being an integer ranging from 1 to (D1-1) and a 0th previous state being an arbitrary state; a second traceback module, based on a (D1)th CONTROL signal, for providing the N1 state mode decoded symbol and a N2 state mode (D1)th previous state, by using the (D1-1)st previous state from the first traceback module and the (D1)th determination vector; a third traceback module, based on a jth CONTROL signal, for sequentially selecting the jth determination vector, iteratively calculating the N2 state mode jth previous state by using the (j-1)st previous state and the jth determination vector, and providing a N2 state mode (D2-1)st previous state, j being an integer ranging from (D1+1) to (D2-1); a fourth traceback module, based on a (D2)th CONTROL signal, for providing the N2 state mode decoded symbol by using the N2 state mode (D2-1)st previous state and a (D2)th determination vector; and a first mode selector, based on the mode selection signal, for selectively providing one of the N1 state mode decoded symbol from the second traceback module and the N2 state mode decoded symbol from the fourth traceback module.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

A preferred embodiment of the present invention is illustrated for the design of a trellis decoder for decoding trellis code data encoded according to a transmission specification of the Grand Alliance High Definition Television (GA HDTV).

Figure 4:
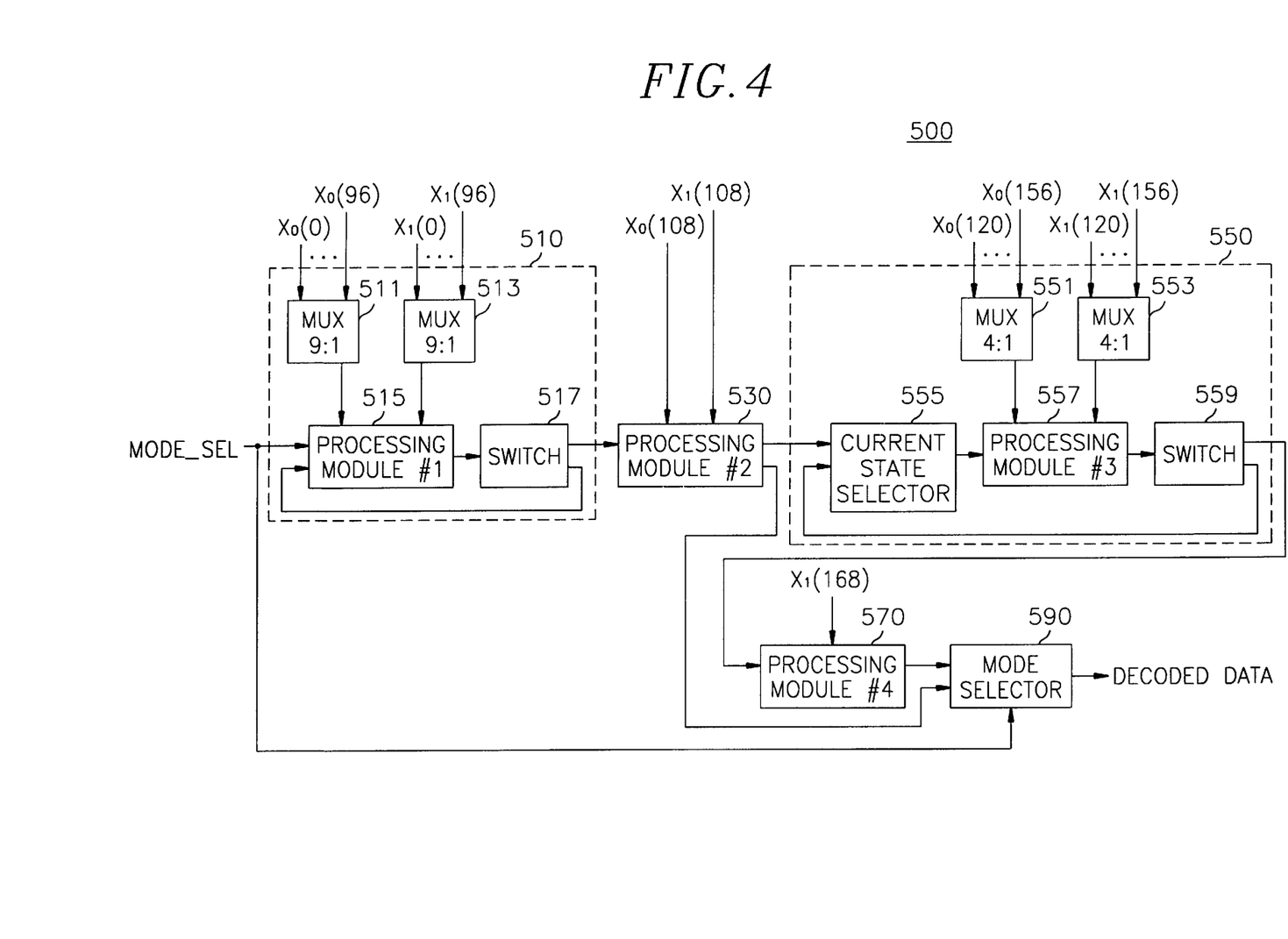
FIG. 4 provides a block diagram of a traceback processor in accordance with the present invention.

Referring to FIG. 4, there is illustrated a block diagram of the traceback processor 500 in accordance with a preferred embodiment of the present invention, which comprises a first traceback module 510, a second traceback module 530, a third traceback module 550, a fourth traceback module 570 and a first mode selector 590. The decoding process is performed based on 16 number of CONTROL signals, wherein each CONTROL signal is 16 times faster than a typical operational signal for the trellis decoder and the CONTROL signal is not shown in FIGS. 4 and 5 for the sake of simplicity.

The first traceback module 510 includes a first 9 input multiplexor(MUX) 511, a second 9 input MUX 513, a first processing module 515 and a first switch 517, and is provided with 9 determination vectors, i.e., DVi(t) to DVi (t−8), wherein the DVi{t−(k−1)} has an upper element $X_0\{12(k-1)\}$ and a lower element $X_1\{12(k-1)\}$ and k is an integer ranging from 1 to 9.

The first 9 input MUX 511 sequentially provides upper elements of the provided determination vectors, i.e., $X_0(0)$, $X_0(12)$, $X_0(24)$, ..., $X_0(96)$, to the first processing module 515; and the second 9 input MUX 513 sequentially provides lower elements of the provided determination vectors, i.e., $X_1(0)$, $X_1(12)$, $X_1(24)$, ..., $X_1(96)$, to the first processing module 515.

At the kth the CONTROL signal, with k ranging from 1 to 9, the first and the second 9 input MUX's 511 and 513 respectively provide $X_0\{12(k-1)\}$ and $X_1\{12(k-1)\}$ to the first processing module 515 and the first processing module 515 calculates a previous state S(t−k) based on the current state $S\{t-(k-1)\}$ and a determination vector $DVi\{t-(k-1)\}=[X_0\{12(k-1)\}, X_1\{12(k-1)\}]$. The detailed structure and operation of the first processing module 515 will be illustrated later with reference to FIG. 5A.

In the mean time, the first switch 517 feeds the previous state S(t−k) from the first processing module 515 back to the first processing module 515 for the kth CONTROL signal, with k ranging from 1 to 8; and provides the previous state S(t−k) to the second traceback module 530 for the kth CONTROL signal, with k being 9.

The second traceback module 530 is provided with S(t−9) from the first switch 517, at the 9th CONTROL signal; determines a maximum likelihood response decoded symbol $[X_1(t-10), X_0(t-10)]$ for the 8 state mode based on the current state S(t−9) and a determination vector $DVi(108)=[X_0(108), X_1(108)]$ to provide the $[X_1(t-10), X_0(t-10)]$ to the first mode selector 590; and calculates a previous state S(t−10) based on the current state S(t−9) and a determination vector $DVi(108)=[X_0(108), X_1(108)]$ to thereby provide the S(t−10) to the second traceback module 550. The detailed structure and operation of the second traceback module 530 will be illustrated later with reference to FIG. 5B.

The third traceback module 550 includes a first 4 input MUX 551, a second 4 input MUX 553, a current state selector 555, a third processing module 557 and a second switch 559 and is provided with 4 determination vectors, i.e., DVi(t−10) to DVi(t−13), wherein the $DVi\{t-(k-1)\}$ has an upper element $X_0\{12(k-1)\}$ and a lower element $X_1\{12(k-1)\}$ and k is an integer ranging from 11 to 14.

The first 4 input MUX 551 sequentially provides upper elements of the provided determination vectors, i.e., $X_0(120)$, $X_0(132)$, $X_0(144)$ and $X_0(156)$, to the third processing module 557; and the second 4 input MUX 553 sequentially provides lower elements of the provided determination vectors, i.e., $X_1(120)$, $X_1(132)$, $X_1(144)$ and $X_1(156)$, to the third processing module 557. At the kth CONTROL signal, with k being an integer ranging from 11 to 14, the first and the second 4 input MUX's 551 and 553 respectively provide $X_0\{12(k-1)\}$ and $X_1\{12(k-1)\}$ to the third processing module 557 and the third processing module 557 calculates a previous state S(t−k) based on the current state $S\{t-(k-1)\}$ and a determination vector $DVi\{t-(k-1)\}=[X_0\{12(k-1)\}, X_1\{12(k-1)\}]$. The detailed structure and operation of the third processing module 557 will be illustrated later with reference to FIG. 5C.

In the mean time, the second switch 559 feeds the previous state S(t−k) back to the current state selector 555 for the kth CONTROL signal, with k being an integer ranging from 11 to 13 and provides the previous state S(t−k) to the fourth traceback module 570 for the kth CONTROL signal, with k being 14.

The current state selector 555 is provided with the S(t−10) from the second traceback module 530 and $S\{t-(k-1)\}$ from the second switch 559, at the kth CONTROL signal. When the value of k is 11, the current state selector 555 selects the S(t−10) to provide same to the third processing module 557; and when the value of k ranges from 12 to 14, the current state selector 555 selects the $S\{t-(k-1)\}$ to provide it to the third processing module 557.

The fourth traceback module 570 is provided with S(t−14) from the second switch 559, at the 15th CONTROL signal; determines a partial response decoded symbol $[X_1(t-15), X_0(t-15)]$ for the 16 state mode to provide the $[X_1(t-15), X_0(t-15)]$ to the first mode selector 590. The detailed structure and operation of the fourth traceback module 570 will be illustrated later with reference to FIG. 5D.

The first mode selector 590 is provided with the maximum likelihood response decoded symbol $[X_1(t-10), X_0(t-10)]$ for the 8 state mode from the second traceback module 530 and the partial response decoded symbol $[X_1(t-15), X_0(t-15)]$ for the 16 state mode from the fourth traceback module 570. If a mode selection signal MODE_SEL represents the 8 state mode, the first mode selector 590 selects the maximum likelihood response decoded symbol [$X_1(t-10)$, $X_0(t-10)$] for the 8 state mode to provide same as decoded data; and if the MODE_SEL represents the 16 state mode, the first mode selector 590 selects the partial response decoded symbol [$X_1(t-15)$, $X_0(t-15)$] for the 16 state mode to provide same as decoded data.

The detailed structures and operations of the first processing module 515, the second traceback module 530, the third processing module 557 and the fourth traceback module 570 are described with reference to FIGS. 5A to 5D.

Figure 5A:
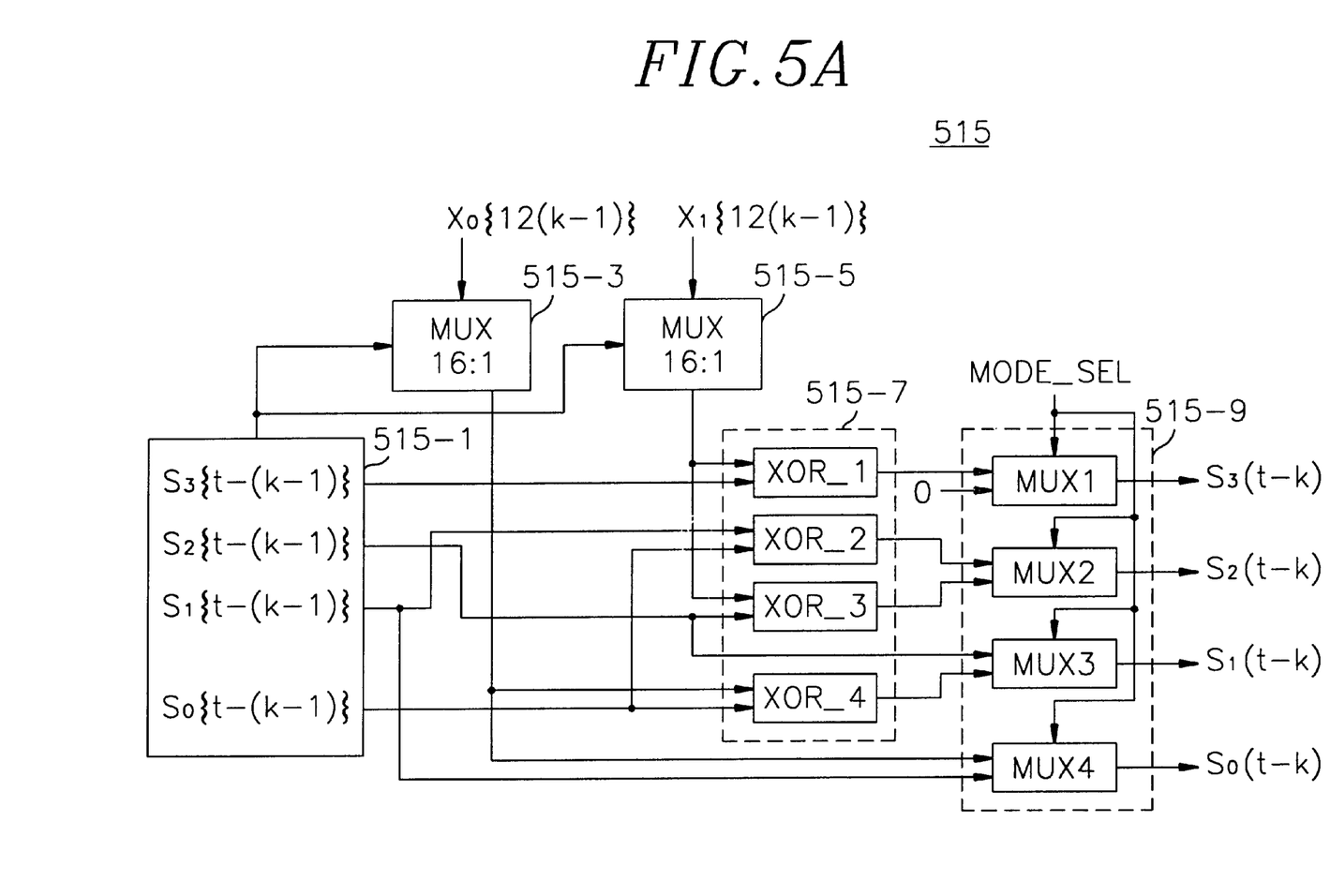
FIGS. 5A to 5D represent a detailed block diagram of each of the processing modules shown in FIG. 4.

Referring to FIG. 5A, there is illustrated a detailed block diagram of the first processing module 515. The first processing module 515 contains a first current state memory 515-1, a first 16 input MUX 515-3, a second 16 input MUX 515-5, a first previous state calculator 515-7 and a second mode selector 515-9.

At the kth CONTROL signal, with k being an integer ranging from 1 to 9, the first current state memory 515-1 has a current state $S\{t-(k-1)\}=[S_3\{t-(k-1)\}, S_2\{t-(k-1)\}, S_1\{t-(k-1)\}, S_0\{t-(k-1)\}]$ and a pair of elements of a kth determination vector $DVi\{t-(k-1)\}$, i.e., $X_0\{12(k-1)\}$ and $X_1\{12(k-1)\}$, is provided to the first and the second 16 input MUX's 515-3 and 515-5 from the first and the second 9 input MUX's 511 and 513.

Since all states converge on a state by tracing back themselves as far as the decoding depth according to a traceback algorithm, it does not matter from which current state the traceback is started. An initial state for the traceback, i.e., the initial value of the first current state memory 515-1 of the first processing module 515 for the 1st CONTROL signal is preferable to be assigned as [0, 0, 0, 0] for the current state $S(t)=[S_3 t), S_2(t), S_1(t), S_0(t)]$.

Back to the case of the kth CONTROL signal, the first 16 input MUX 515-3 selects a bit $X_{0,k-1}$ corresponding to the current state $S\{t-(k-1)\}$ among 16 bits of the $X_0\{12(k-1)\}$ to provide the $X_{0,k-1}$ to a fourth exclusive OR gate(XOR_4) in the first previous state calculator 515-7 and a fourth 2 input MUX(MUX4) in the second mode selector 515-9; and the second 16 input MUX 515-5 selects a bit $X_{1,k-1}$ corresponding to the current state $S\{t-(k-1)\}$ among 16 bits of the $X_1\{12(k-1)\}$ to provide the $X_{1,k-1}$ to a first exclusive OR gate(XOR_1) and a third exclusive OR gate(XOR_3) in the first previous state calculator 515-7.

Meanwhile, the first element $S_3\{t-(k-1)\}$ of the current state is applied to a first exclusive OR gate(XOR_1) in the first previous state calculator 515-7; the second element $S_2\{t-(k-1)\}$ of the current state is applied to the XOR_3 and the third MUX(MUX3) in the second mode selector 515-9; the third element $S_1\{t-(k-1)\}$ of the current state is applied to a second exclusive OR gate(XOR_2) in the first previous state calculator 515-7 and the MUX4; and the fourth element $S_0\{t-(k-1)\}$ of the current state is applied to the XOR_2 and the XOR_4.

The first previous state calculator 515-7 determines the previous state $S(t-k)$ based on the current state $S\{t-(k-1)\}$ and the $X_{0,k-1}$ and the $X_{1,k-1}$ from the first and the second 16 input MUX's 515-3 and 515-5 by using the following equations, wherein Eq. (3) is used for the 16 state mode symbol and Eq. (4) is used for the 8 state mode symbol.

$S(t-k)=[S_3(t-k), S_2(t-k), S_1(t-k), S_0(t-k)]$ $=[S_3\{t-(k-1)\}\oplus X_{1,k-1}, S_1\{t-(k-1)\}\oplus S_0\{t-(k-1)\}, S_2\{t-(k-1)\}, X_{0,k-1}]$   Eq. (3);

$S(t-k)=[S_2(t-k), S_1(t-k), S_0(t-k)]$ $=[S_2\{t-(k-1)\}\oplus X_{1,k-1}, X_{0,k-1}\oplus S_0\{t-(k-1)\}, S_1\{t-(k-1)\}]$   Eq. (4).

The determined previous state $S(t-k)$ is provided to the second mode selector 515-9. The second mode selector 515-9 has 4 number of 2 input MUX's, wherein each of the 4 number of 2 input MUX's has two input terminals, i.e., 16 state and 8 state input terminals. The 16 state terminal of each 2 input MUX receives a 16 state input signal, while the 8 state input terminal thereof receives an 8 state input signal.

Specifically, a first 2 input MUX(MUX1) is provided with the output of the XOR_1, i.e., $S_3\{t-(k-1)\}\oplus X_{1,k-1}$ for the 16 state input signal and "0" for the 8 state input signal; a second 2 input MUX(MUX2) is provided with the output of the XOR_2, i.e., $S_1\{t-(k-1)\}\oplus S_0\{t-(k-1)\}$ for the 16 state input signal and the output of the XOR_3, i.e., $S_2\{t-(k-1)\}\oplus X_{1,k-1}$ for the 8 state input signal; the MUX3 is provided with the $S_2\{t-(k-1)\}$ from the first current state memory 515-1 for the 16 state input signal and the output of the XOR_4, i.e., $X_{0,k-1}\oplus S_0\{t-(k-1)\}$ for the 8 state input signal; and the MUX4 is provided with the $X_{0,k-1}$ from the first 16 input MUX 515-3 for the 16 state input signal and $S_1\{t-(k-1)\}$ from the first current state memory 515-1 for the 8 state input signal.

If the MODE_SEL indicates the 16 state mode, each MUX of the second mode selector 515-9 selects the 16 state input signal so that the second mode selector 515-9 provides a previous state $S(t-k)=[S_3(t-k),S_2(t-k),S_1(t-k),S_0(t-k)]=[S_3\{t-(k-1)\}\oplus X_{1,k-1}, S_1\{t-(k-1)\}\oplus S_0\{t-(k-1)\}, S_2\{t-(k-1)\}, X_{0,k-1}]$ for the 16 state mode; and if otherwise, each MUX thereof selects the 8 state input signal so that the second mode selector 515-9 provides a previous state $S(t-k)=[S_2(t-k), S_1(t-k), S_0(t-k)]=[S_2\{t-(k-1)\}\oplus X_{1,k-1}, X_{0,k-1}\oplus S_0\{t-(k-1)\},S_1\{t-(k-1)\}]$ for the 8 state mode.

The previous state $S(t-k)$ outputted from the second mode selector 515-9 is provided to the first switch 517.

Figure 5B:
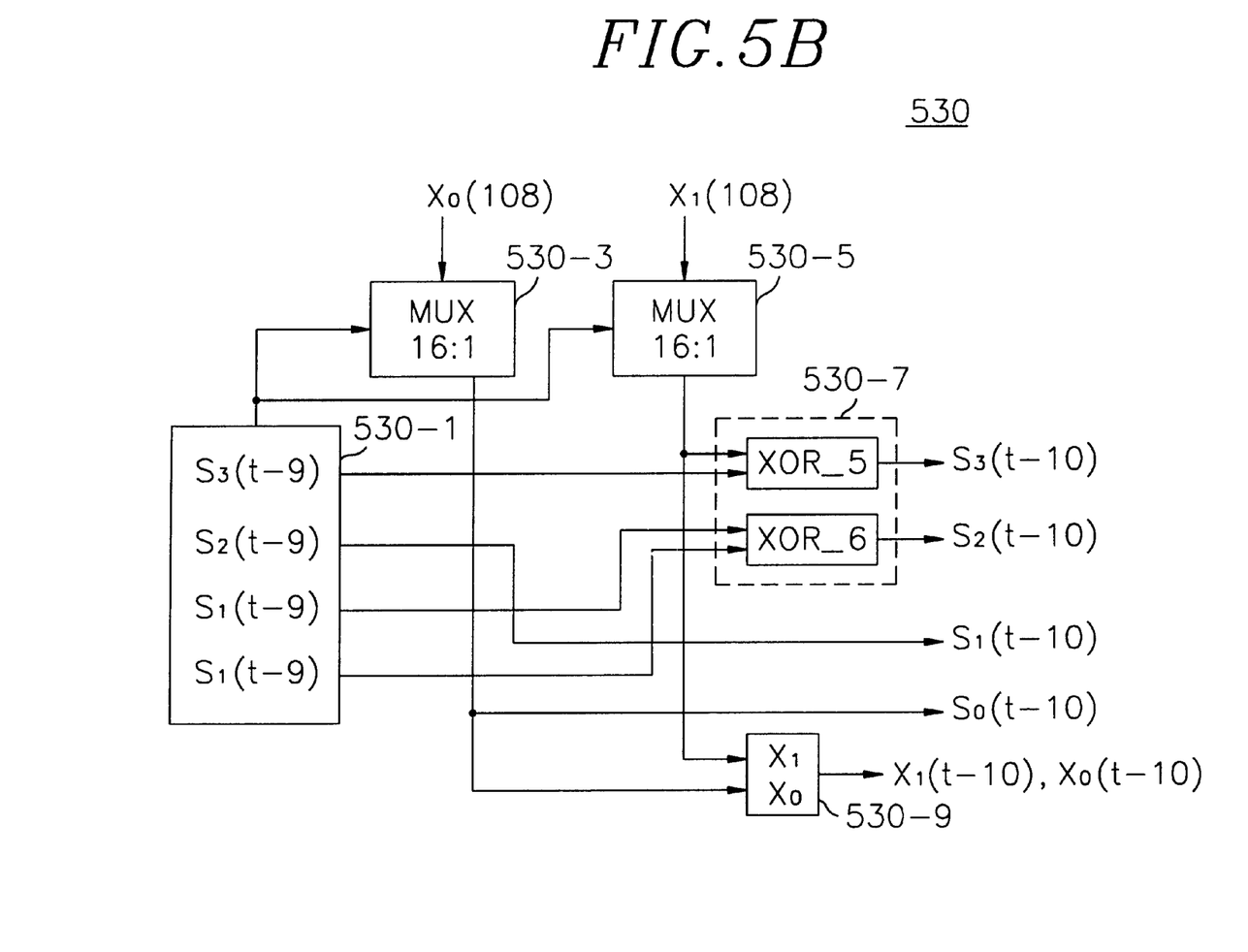

Referring to FIG. 5B, there is depicted the detailed block diagram of the second traceback module 530. The second traceback module 530 includes a second current state memory 530-1, a third 16 input MUX 530-3, a fourth 16 input MUX 530-5, a second previous state calculator 530-7 and an 8 state mode symbol memory 530-9, wherein the function and the operation of the second current state memory 530-1, the third and the fourth 16 input MUX's 530-3 and 530-5 and the second previous state calculator 530-7 are similar to those of the first current state memory 515-1, the first and the second 16 input MUX's 515-3 and 515-5 and the first previous state calculator 515-7.

At the 9th CONTROL signal, the second current state memory 530-1 in the second traceback module 530 is provided with a current state $S(t-9)=[S_3(t-9), S_2(t-9), S_1(t-9), S_0(t-9)]$ and a pair of elements of a 10th determination vector $DVi(t-9)$, i.e., $X_0(108)$ and $X_1(108)$, is provided to the third and fourth 16 input MUX's 530-3 and 530-5. The third 16 input MUX 530-3 selects a bit $X_{0,9}$ corresponding to the current state $S(t-9)$ among 16 bits of the $X_0(108)$ to provide the $X_{0,9}$ as an upper element $X_0(t-10)$ of an 8 state mode decoded data to the 8 state mode symbol memory 530-9 and as a fourth element $S_0(t-10)$ of the previous state $S(t-10)$ to the current state selector 555 in the third traceback module 550; and the fourth 16 input MUX 530-5 selects a bit $X_{1,9}$ corresponding to the current state $S(t-9)$ among 16 bits of the $X_1(108)$ to provide the $X_{1,9}$ to a fifth exclusive OR gate(XOR_5) in the second previous state calculator 530-7 and as a lower element $X_1(t-10)$ of the 8 state mode decoded data to the 8 state mode symbol memory 530-9.

Meanwhile, the first element $S_3(t-9)$ of the current state is applied to the XOR_5; the second element $S_2(t-9)$ of the current state is applied as a third element $S_1(t-10)$ of the previous state $S(t-10)$ to the current state selector 555 in the third traceback module 550; the third element $S_1(t-9)$ of the current state is applied to a sixth exclusive OR gate(XOR_6); and the fourth element $S_0(t-9)$ of the current state is applied to the XOR_6.

The second previous state calculator 530-7 determines the first and the second elements of the previous state $S(t-10)$, i.e., $S_3(t-10)$ and $S_2(t-10)$, for the 16 state mode based on the current state $S(t-9)$ and the $X_{1,9}$ from the fourth 16 input MUX 530-5 by using Eq. (3). The first and second elements $S_3(t-10)$ and $S_2(t-10)$ determined at the second previous state calculator 530-7, the third element $S_1(t-10)$ from the second current state memory 530-1 and the fourth element $S_0(t-10)$ from the third 16 input MUX 530-3 are provided to the current state selector 555 in the third traceback module 550. And, the 8 state mode symbol memory 530-9 provides the $X_1(t-10)$ and $X_0(t-10)$ to the first mode selector 590 as the 8 state mode decoded data.

Figure 5C:
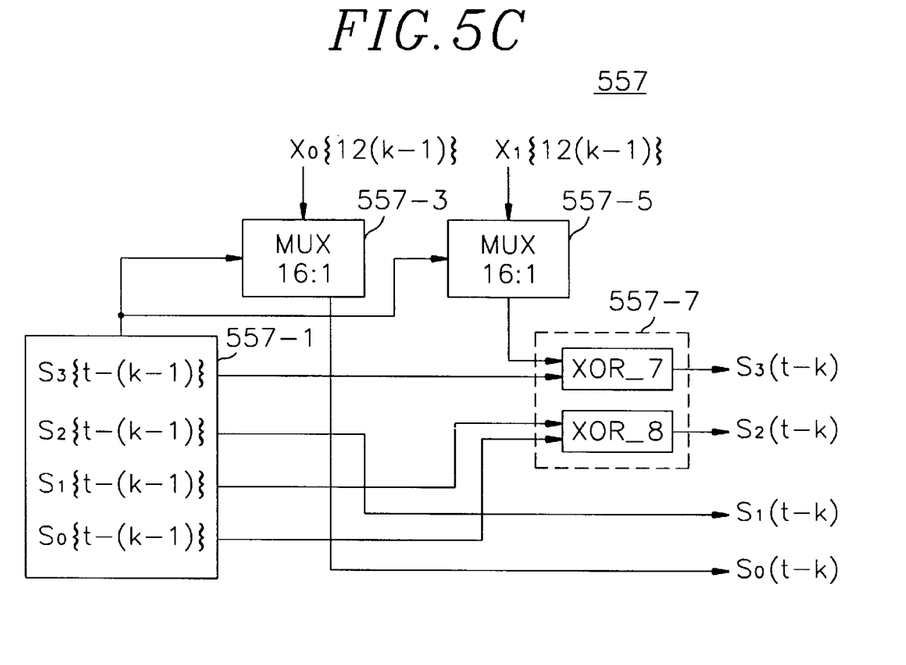

Referring to FIG. 5C, there is provided a detailed block diagram of the third processing module 557. The third processing module 557 contains a third current state memory 557-1, a fifth 16 input MUX 557-3, a sixth 16 input MUX 557-5 and a third previous state calculator 557-7.

At the kth CONTROL signal, with k being an integer ranging from 11 to 14, the third current state memory 557-1 has a current state $S\{t-(k-1))\}=[S_3\{t-(k-1)\}, S_2\{t-(k-1)\}, S_1\{t-(k-1)\}, S_0\{t-(k-1)\}]$ and a pair of elements of a determination vector $DVi\{t-(k-1)\}$, i.e., $X_0\{12(k-1)\}$, $X_1\{12(k-1)\}$, is provided to the fifth and the sixth 16 input MUX's 557-3 and 557-5 from the first and the second 4 input MUX's 551 and 553.

The fifth 16 input MUX 557-3 selects a bit $X_{0,k-1}$ corresponding to the current state $S\{t-(k-1)\}$ among 16 bits of the $X_0\{12(k-1)\}$ to provide the $X_{0,k-1}$ to the second switch 559 as a fourth element $S_0(t-k)$ of the previous state $S(t-k)$; and a sixth 16 input MUX 557-5 selects a bit $X_{1,k-1}$ corresponding to the current state $S\{t-(k-1)\}$ among 16 bits of the $X_1\{12(k-1)\}$ to provide the $X_{0,k-1}$ to a seventh exclusive OR gate(XOR_7) in the third previous state calculator 557-7.

Meanwhile, the first element $S_3\{t-(k-1)\}$ of the current state is applied to the XOR_7 in the first previous state calculator 557-7; the second element $S_2\{t-(k-1)\}$ of the current state is applied to the second switch 559 as a third element $S_1(t-k)$ of the previous state $S(t-k)$; the third element $S_1\{t-(k-1)\}$ of the current state is applied to an eighth exclusive OR gate(XOR_8) in the third previous state calculator 557-7; and the fourth element $S_0\{t-(k-1)\}$ of the current state is applied to the XOR_8.

The third previous state calculator 557-7 determines the previous state $S(t-k)$ based on the current state $S\{t-(k-1)\}$ and the $X_{0,k-1}$ and the $X_{1,k-1}$ from the fifth and the sixth 16 input MUX's 557-3 and 557-5 by using Eq. (3). The first and second elements $S_3(t-k)$ and $S_2(t-k)$ determined at the third previous state calculator 557-7, the third element $S_1(t-k)$ from the third current state memory 557-1 and the fourth element $S_0(t-k)$ from the fifth 16 input MUX 557-3 are provided to the second switch 559 in the third traceback module 550.

Figure 5D:
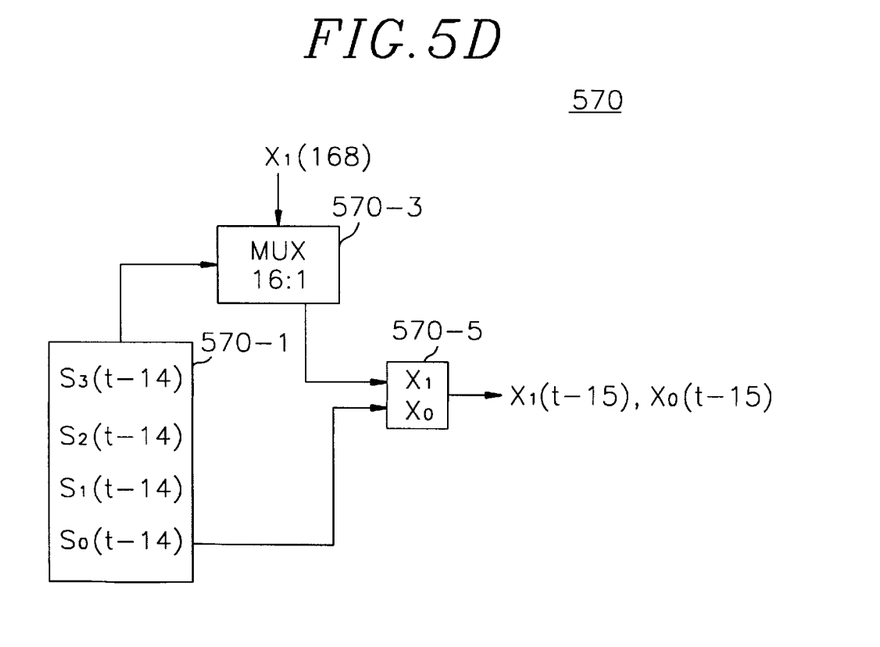

Referring to FIG. 5D, there is shown the detailed block diagram of the fourth traceback module 570. The fourth traceback module 570 includes a fourth current state memory 570-1, a seventh 16 input MUX 570-3 and a 16 state mode symbol memory 570-5.

At the 15th CONTROL signal, the fourth current state memory 570-1 is provided with a current state $S(t-14)=[S_3(t-14), S_2(t-14), S_1(t-14), S_0(t-14)]$ and a lower element of a 15th determination vector $DVi(t-15)$, i.e., $X_1(168)$, is provided to the seventh 16 input MUX 570-3. The seventh 16 input MUX 570-3 selects a bit $X_{1,14}$ corresponding to the current state $S(t-14)$ among 16 bits of the $X_1(168)$ to provide the $X_{1,14}$ to the 16 state mode symbol memory 570-5 as a lower element $X_1(t-15)$ of a 16 state mode decoded data.

Meanwhile, the fourth element of the current state, i.e., $S_0(t-14)$, is applied to the 16 state mode symbol memory 570-5 as an upper element $X_0(t-15)$ of the 16 state mode decoded data. The 16 state mode symbol memory 570-5 provides the $X_1(t-15)$ and $X_0(t-15)$ to the first mode selector 590 as the 16 state mode decoded data.

As described above, the present invention provides an improved traceback processor, for use in a trellis decoder, which is constructed with a reduced number of processing modules and operates based on the CONTROL clock rather than the conventional clock, thereby achieving a significant reduction in processing time as well as the manufacturing cost or complexity of the device. Since the traceback processor operates based on the CLOCK which is 16 times faster than the conventional clock, the traceback process can be performed in one conventional clock. Therefore, the number of processing module is reduced down and the total time needed to traceback does not increase.

Although it is explained only for the case when the decoder selectively performs either of the 8 state mode and the 16 state mode decodings, the present invention is applicable to other cases when the decoder selectively performs either of arbitrary two state mode decodings.

While the present invention has been described with respect to certain preferred embodiments only, other modifications and variations may be made without departing from the spirit and scope of the present invention as set forth in the following claims.

What is claimed is:

1. A traceback processor of a survivor memory unit for use in a trellis-coded modulation decoder, wherein the survivor memory unit includes a data delay processor and the traceback processor, the data delay processor provides determination vectors in parallel and the traceback processor selectively provides one of an N1 and an N2 state mode decoded symbols during M number of CONTROL signals, a decoding depth corresponding to the N1 state mode decoded symbol being D1, a decoding depth corresponding to the N2 state mode decoded symbol being D2, N1 being a positive integer, N2 being an integer larger than N1, D1 being a positive integer, D2 being an integer larger than D1 and M being an integer larger than D2, the traceback processor comprising:

a first traceback module, based on an ith CONTROL signal, for sequentially selecting an ith determination vector, iteratively calculating an N1 state mode ith previous state by using an N1 state mode (i−1)st previous state and the ith determination vector and an N2 state mode ith previous state by using an N2 state mode (i−1)st previous state and the ith determination vector, and providing one of an N1 state mode (D1−1)st previous state and an N2 state mode (D2−1)st previous state, based on a mode selection signal, wherein i being an integer ranging from 1 to (D1−1) and a 0th previous state being an arbitrary state;

a second traceback module, based on a (D1)th CONTROL signal, for providing the N1 state mode decoded symbol and a N2 state mode (D1)th previous state, by using the (D1−1)st previous state from the first traceback module and the (D1)th determination vector;

a third traceback module, based on a jth CONTROL signal, for sequentially selecting the jth determination vector, iteratively calculating the N2 state mode jth previous state by using the (j−1)st previous state and the jth determination vector, and providing a N2 state mode (D2−1)st previous state, j being an integer ranging from (D1+1) to (D2−1);

a fourth traceback module, based on a (D2)th CONTROL signal, for providing the N2 state mode decoded symbol by using the N2 state mode (D2−1)st previous state and a (D2)th determination vector; and a first mode selector, based on the mode selection signal, for selectively providing one of the N1 state mode decoded symbol from the second traceback module and the N2 state mode decoded symbol from the fourth traceback module.

2. The traceback processor of claim 1, wherein the first traceback module includes:

a set of two (D1−1) input multiplexors, based on the ith CONTROL signal, for sequentially providing an upper element and a lower element of the ith determination vector, respectively;

a first processing module for providing one of the N1 state mode ith previous state by using the N1 state mode (i−1)st previous state and the upper elements of the ith determination vector and the N2 state mode ith previous state by using the (i−1)st previous state and the lower and the upper elements of the ith determination vector; and a first switch for providing the ith previous state from the first processing module back to the first processing module when i ranges from 1 to (D1−2) and providing the ith previous state from the first processing module to the second processing module when i is (D1−1).

3. The traceback processor of claim 2, wherein the third traceback module includes:

a set of two (D2−D1−1) input multiplexors, based on the jth CONTROL signal, for sequentially providing an upper element and a lower element of the jth determination vector, respectively;

means for selectively providing the D2 state (j−1)st previous state from the second traceback module to a second processing module when j is (D1+1) and the D2 state (j−1)st previous state from the third processing module back to the second processing module when j ranges from (D1+2) to (D2−1);

the second processing module for calculating the D2 state jth previous state by using the D2 state (j−1)st previous state and the lower and the upper elements of the ith determination vector; and a second switch for providing the N2 state mode jth previous state from the third processing module to the selectively providing means when j ranges from (D1+1) to (D2−2) and providing the N2 state mode jth previous state from the third processing module to the fourth processing module when j is (D2−1).

4. The traceback processor of claim 3, wherein the first processing module contains:

a first state memory for storing one of the N1 state mode (i−1)st previous state and the N2 state mode (i−1)st previous state;

a first set of two D2 input multiplexors, based on the (i−1)st previous state from the first state memory, for selecting a bit from each of the upper and the lower elements of the ith determination vector, respectively;

a first previous state calculator for calculating the N1 state mode ith previous state by using the N1 state mode (i−1)st previous state from the first state memory and the bits selected by the first set of the two D2 input multiplexors and the N2 state mode ith previous state by using the N2 state mode (i−1)st previous state from the first state memory and the bits selected by the first set of the two D2 input multiplexors; and a second mode selector for providing the N1 state mode (D1−1)st previous state to the second processing module when the mode selection signal indicates the N1 state mode and providing the N2 state mode (D1−1)st previous state to the second processing module when the mode selection signal indicates the N2 state mode.

5. The traceback processor of claim 4, wherein the second traceback module contains:

a second state memory for storing the (D1−1)st previous state;

a second set of two D2 input multiplexors, based on the (D1−1)st previous state, for selecting a bit of each of the upper and the lower elements of the (D1)th determination vector, respectively;

a second previous state calculator for calculating a N2 state mode (D1)th previous state by using the (D1−1)st previous state and the bits selected by the second set of the two D2 input multiplexors thereby providing the N2 state mode (D1)th previous state to the second traceback module; and means for providing the bits selected by the second set of the two D2 input multiplexors as the N1 state mode decoded symbol to the first mode selector.

6. The traceback processor of claim 5, wherein the second processing module contains:

a third state memory for storing the (j−1)st previous state;

a third set of two D2 input multiplexors, based on the (j−1)st previous state, for selecting a bit of each of the upper and the lower elements of the jth determination vector, respectively; and a third previous state calculator for calculating a N2 state mode jth previous state by using the (j−1)st previous state and the bits selected by the second set of the two D2 input multiplexors and providing the N2 state mode jth previous state to the second switch.

7. The traceback processor of claim 6, wherein the fourth traceback module contains:

a fourth state memory for storing the (D2−1)st previous state;

a D2 input multiplexor, based on the (D2−1)st previous state, for selecting a bit of the lower element of the (D2)th determination vector; and means for calculating N2 state mode decoded symbol by using the (D2−1)st previous state and the bit selected by the D2 input multiplexor and providing the N2 state mode decoded symbol to the first mode selector.

8. The traceback processor of claim 7, wherein N1 is $2^L$ and N2 is $2^{L+1}$.

9. The traceback processor of claim 8, wherein N1 is 8, N2 is 16, D1 is 10, D2 is 15 and M is 16.

10. The traceback processor of claim 9, wherein the 16 state mode (k)th previous state and the 8 state mode (l)th previous state are respectively calculated by using the following equations:

$$S^{16}(t-k)=[S_3(t-k), S_2(t-k), S_1(t-k), S_0(t-k)]=[S_3\{t-(k-1)\}\oplus X_{1,k}, S_1\{t-(k-1)\}\oplus S_0\{t-(k-1)\}, S_2\{t-(k-1)\}, X_{0,k}]$$

wherein $S^{16}(t-k)$ denotes the 16 state mode (k)th previous state; k, a positive integer not larger than 15; $S_3(t-k)$ to $S_0(t-k)$, a first to a fourth element of the 16 state mode (k)th previous state; $S_3\{t-(k-1)\}$ to $S_0\{t-(k-1)\}$, a first to a fourth element of the 16 state mode (k-1)st previous state; $X_{0,k}$ and $X_{1,k}$, selected bits respectively from an upper and a lower elements of the (k)th determination vector; and $\oplus$, an exclusive OR operator; and $$S^8(t-l)=[S_2(t-l),S_1(t-l),S_0(t-l)]=[S_2\{t-(l-1)\}\oplus X_{1,l}, X_{0,l}\oplus S_0\{t-(l-1)\}, S_1\{t-(l-1)\}]$$

wherein $S^8(t-l)$ denotes the 8 state mode (l)th previous state; l, a positive integer not larger than 10; $S_2(t-l)$ to $S_0(t-l)$, a first to a third element of the 8 state mode (l)th previous state; $S_2\{t-(l-1)\}$ to $S_0\{t-(l-1)\}$, a first to a third element of the 8 state mode (l-1)st previous state; $X_{0,l}$ and $X_{1,l}$, selected bits respectively from an upper and a lower elements of the (l)th determination vector; and $\oplus$, an exclusive OR operator.

* * * * *